(12) United States Patent
Kitze

(10) Patent No.: US 7,356,487 B2
(45) Date of Patent: Apr. 8, 2008

(54) EFFICIENT TRANSPORTATION OF DIGITAL FILES IN A PEER-TO-PEER FILE DELIVERY NETWORK

(75) Inventor: Christopher Allin Kitze, Incline Village, NV (US)

(73) Assignee: Qurio Holdings, Inc., Raleigh, NC (US)

( * ) Notice: Subject to any disclaimer, the term of this patent is extended or adjusted under 35 U.S.C. 154(b) by 1388 days.

(21) Appl. No.: 09/881,523

(22) Filed: Jun. 14, 2001

(65) Prior Publication Data

US 2002/0194108 A1 Dec. 19, 2002

(51) Int. Cl.
*G06Q 40/00* (2006.01)
(52) U.S. Cl. .............................. 705/26; 705/37; 705/35; 705/400; 370/389; 379/112; 709/223; 713/200; 726/26
(58) Field of Classification Search ................ 370/389; 705/35, 400, 37; 379/112; 709/223; 713/200; 726/26
See application file for complete search history.

(56) References Cited

U.S. PATENT DOCUMENTS

| 6,012,045 | A   | * | 1/2000  | Barzilai et al. ................ 705/37 |
| 6,167,124 | A   | * | 12/2000 | Johnson et al. ......... 379/112.01 |
| 6,199,054 | B1  | * | 3/2001  | Khan et al. .................. 705/400 |
| 6,295,294 | B1  | * | 9/2001  | Odlyzko ...................... 370/389 |
| 6,647,373 | B1  | * | 11/2003 | Carlton-Foss ................ 705/37 |
| 7,043,644 | B2  | * | 5/2006  | DeBruine ................... 713/153 |

OTHER PUBLICATIONS

Ebay.com (total of 85 pages).*

* cited by examiner

*Primary Examiner*—Harish T. Dass
(74) *Attorney, Agent, or Firm*—Withrow & Terranova PLLC

(57) ABSTRACT

A method and system for efficiently transporting digital files over a peer-to-peer network is disclosed, where the network includes at least one server node and multiple client nodes. According to the method and system when a digital file is to be transferred over the network from a sending node to a receiving node, other nodes are allowed to submit bids to transport the file over the network for a particular price. The node with the lowest bid is then allowed to transport to file to the receiving node, thereby optimizing network traffic based on economics.

26 Claims, 6 Drawing Sheets

EFFICIENT TRANSPORTATION OF DIGITAL FILES IN A PEER-TO-PEER FILE DELIVERY NETWORK

FIELD OF THE INVENTION

The present invention relates to peer-to-peer networks, and more particularly to a method and system for efficiently transporting digital files in a peer-to-peer file delivery network.

BACKGROUND OF THE INVENTION

The Internet may be viewed as containing distributed information and centralized information. The distributed information is located throughout the Internet and typically takes the form of domain name servers and IP addresses, for instance. The centralized information is content, such as web pages and files, which is stored on and served by central servers.

Gaining access to such centralized content, however, is becoming increasingly difficult due to growing Internet congestion, limited bandwidth, and increasing file sizes (especially for media rich content). Traditional Internet technologies for distributing content, such as e-mail, streaming media, and FTP, have proven inadequate. E-mail is inadequate because due to the number of email messages and attachments passing through email servers, restrictions are placed on the sizes of emails that restrict what can be sent as attachments. E-mail also has security issues. PGP encryption is available for securing e-mails, but is not widely adopted.

Streaming media has the disadvantages of not working with all file types and is expensive because providers must purchase different software for the various streaming media standards. Streaming media also has not proven to be a reliable transfer method. And FTP file transfers also have disadvantages, which include being technically challenging to most users, and suffering from inefficient file transfers. There are other solutions for distributing content, but they are usually proprietary and do not scale well.

Another problem with distributing centralized content is cost. As file sizes increase, the distribution of content is becoming increasingly expensive for content providers due to metered pricing of used bandwidth. In metered pricing, a content provider's Internet-Service-Provider (ISP) monitors the output of the servers used to provide the content, and charges the content provider 95% of the peak usage even though the average output is much lower. Thus, the cost of distributing content from central servers is one reason why attempts have been made to decentralize content. In addition, a company's servers almost always have excess bandwidth, particularly during non-business or off-peak hours, that goes unused but paid for.

One way to decentralize content is through peer-to-peer networks. Peer-to-peer network computing is a more efficient means for distributing resources and content over the Internet. In a peer-to-peer network, all workstations and computers in the network may act as servers to all other users on the network. Some peer applications gain efficiencies by aggregating the distributed storage capacity of the computers across the network, such as Napster™ and Gnutella™, or aggregating the idle computing cycles of the computers, such as SETI@home™. Still others, such as instant messaging, take advantage of the direct network connections that peer devices can make to enhance communications.

Although peer networks are effective, current peer networks have disadvantages. One disadvantage is that file transfers across the network are often inefficient. When transporting a file from a sending node to a receiving node, the file may be routed across the network based on factors such as the shortest path. This may result in routing the file across nodes in the network that are heavily congested and have low bandwidth availability, while other nodes in the network are idle. Thus, peer networks are inefficient because they fail to optimize network traffic and often fail to take advantage of unused bandwidth.

In addition, most P2P efforts today are focused on private networks due to copyright liability concerns. For example, Napster has been held liable for the exchange of copyrighted information on its network. Companies are now trying to distance themselves from public networks, because there are currently no established standards between P2P network providers and the copyright holders. This means that information shared on private P2P networks is not available for a broad anonymous mass, but for a self selected pair or group of people who consciously choose to do so. Instead of attempting to propose solutions for public P2P networks, most companies are turning inward towards private P2P networks.

Accordingly, what is needed is a more efficient method for transporting files across a public peer network that optimizes network traffic by taking advantage of unused network bandwidth. The present invention addresses such a need.

SUMMARY OF THE INVENTION

The present invention provides a method and system for efficiently transporting digital files over a peer-to-peer network. The network includes at least one server node and multiple client nodes. According to the method and system when a digital file is to be transferred over the network from a sending node to a receiving node, other nodes are allowed to submit bids to transport the file over the network for a particular price. The node with the lowest bid is then allowed to transport to file to the receiving node, thereby optimizing network traffic based on economics.

According to the system and method disclosed herein, the present invention grants to peers the ability to generate extra revenue during off-peak hours, and in an embodiment where the sender can choose from levels of quality of service for delivery, the present invention further allows the network to route/deliver digital files based on the chosen level of quality of service.

DETAILED DESCRIPTION

The present invention relates to peer-to-peer networks, and more particularly to a method and system for efficiently transferring files in a peer-to-peer file delivery network. The following description is presented to enable one of ordinary skill in the art to make and use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiments shown but is to be accorded the widest scope consistent with the principles and features described herein.

The present invention provides a secure e-delivery network for large files, both commercial and private, and a method for efficiently transporting the files that optimizes network traffic based on economics.

Figure 1A:
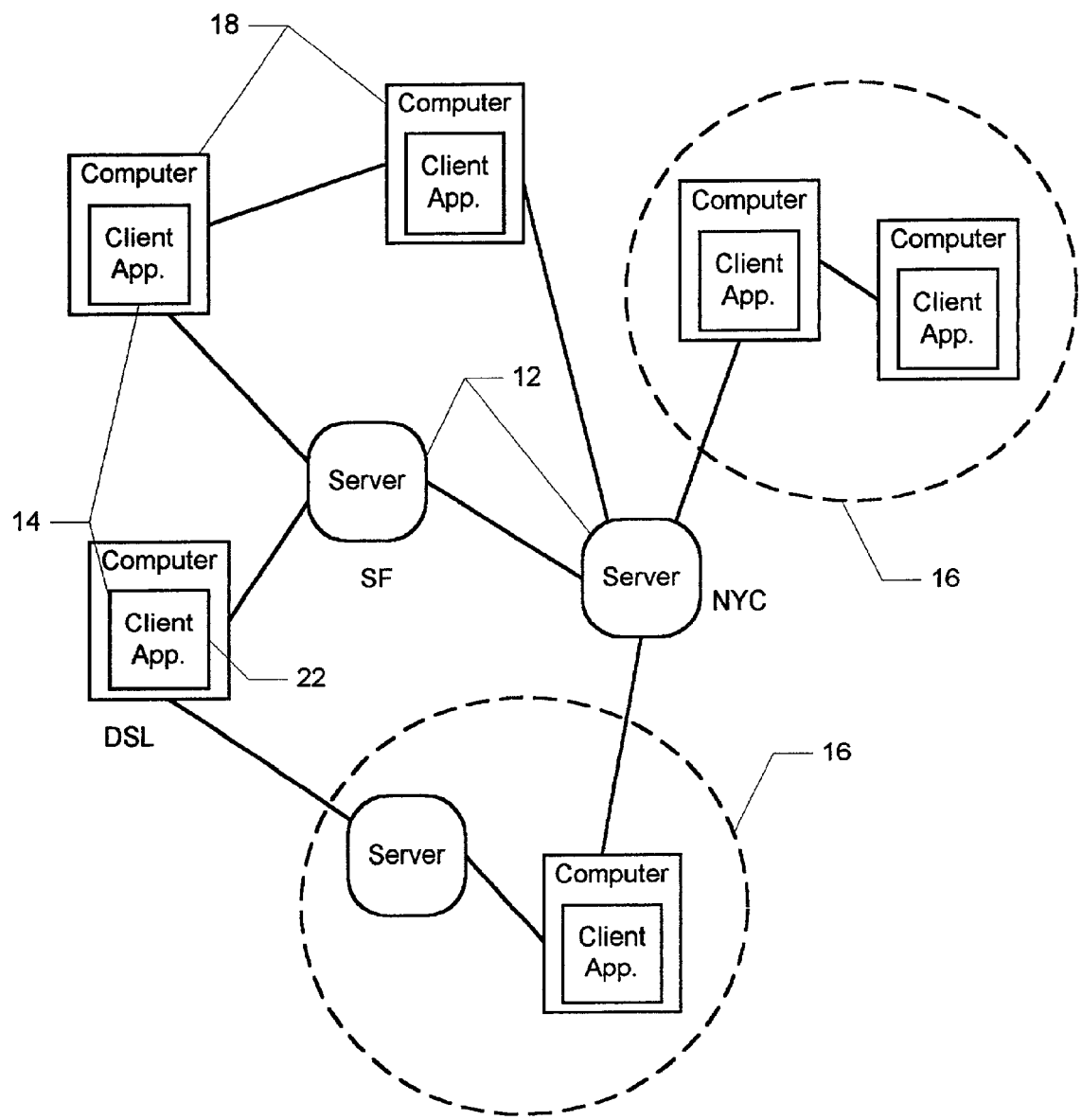
FIGS. 1A and 1B are block diagrams illustrating a peer-to-peer (P2P) network architecture.
Figure 1B:
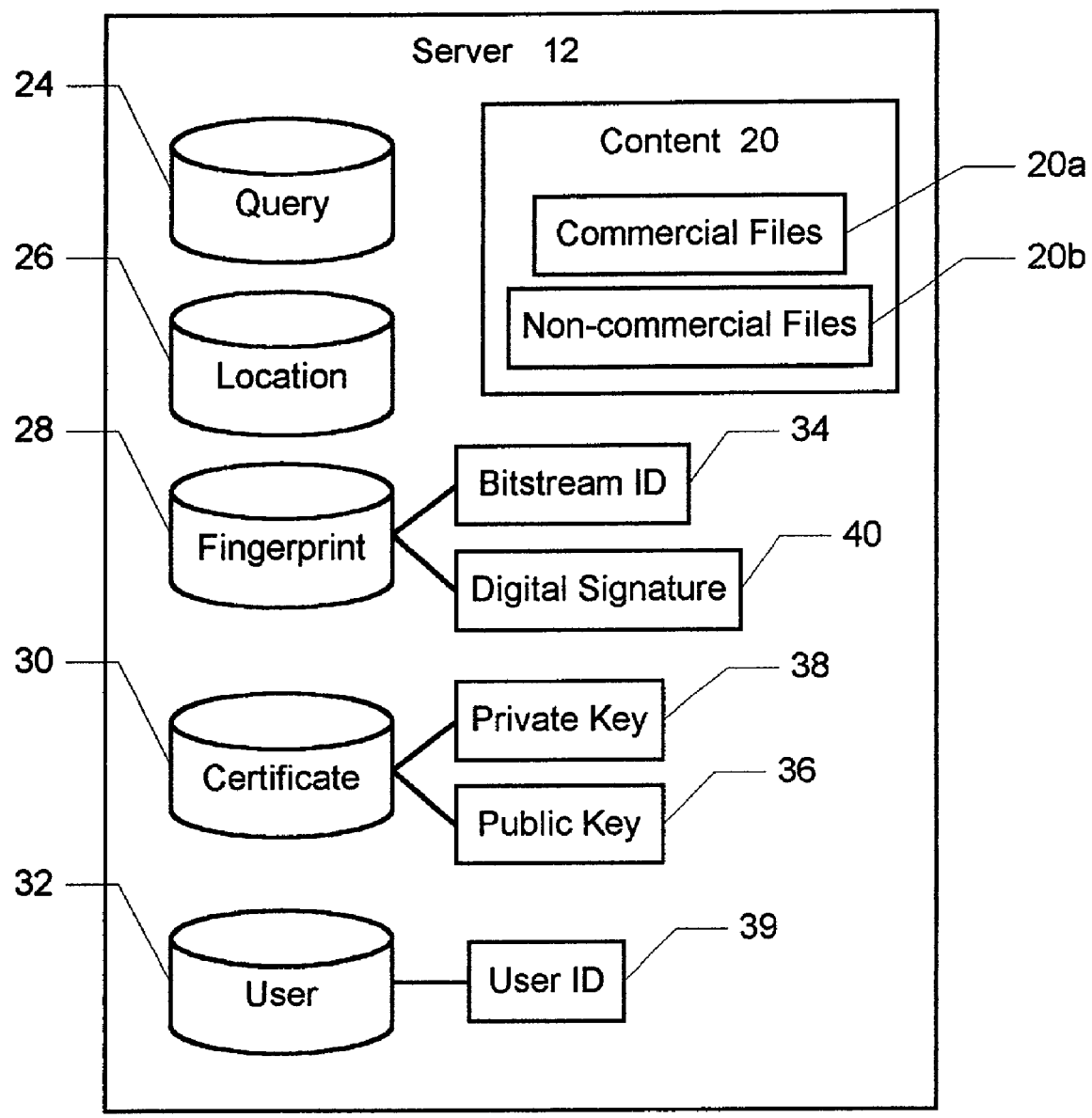

FIGS. 1A and 1B are block diagrams illustrating a peer-to-peer (P2P) network architecture in accordance with one preferred embodiment of the present invention. The peer-to-peer network 10 includes a plurality of computers 18 interconnected over a public network, such as Internet, where some of the computers 18 are configured as server nodes 12, and other computers 18 are configured as client nodes 14. A client node 14 may represent a single computer or a proprietary network, such as AOL, or a cable network, for example, and in a preferred embodiment, the server nodes 14 are located worldwide.

Any combination of server nodes 12 and client nodes 14 may form extranets 16 that are protected by firewalls (not shown). As is well known in the art, an extranet 16 is basically a private network that uses the public Internet as its transmission system, but requires passwords to gain entrance.

The primary purpose of the peer-to-peer network 10 is the propagation of content over the network 10. FIG. 1B is a diagram illustrating contents of the server nodes 12. A server node 12 as used herein may refer to any computer that combines hosting services with databases. In a preferred embodiment, each server node 12 stores content 20 that comprise both commercial files 20*a* and noncommercial files 20*b*. Both a publisher of the content 20 and a recipient of the content 20 have a vested interest in secure and reliable delivery of the content 20. Example type of content files may include audio files, video files, news articles and online magazines, image files, and confidential documents, for instance.

A computer 18 becomes a client node 14 by installing and running a P2P client application 22 designed for public networks that operates as described herein. In operation, the client application 22 allows the client node 14 to authenticate other client nodes 14 and to both receive content 20 and serve content 20.

In a preferred embodiment, the network 10 offers users several types of file sharing. The most common type of file sharing is peer-to-peer on-demand file sharing. As used herein, peer-to-peer file sharing refers to the initiation of a file download by a client node 14 from either the server node 12 or another client node 14. Content made available for downloading in this manner may be referred to as "on demand" content because the content is available for downloading by the client nodes 14 at anytime. In a preferred embodiment, on-demand content includes both fee-based content and free content. If the content downloaded is free to a user, then the provider of the content may be charged a fee for the serving of the content based on the quantity of the data transferred. If the content downloaded is fee-based, however, then the user of the initiating client node may be charged the downloading fee.

The second type of file sharing offered is decentralized downloads of subscription-based content 20. Client nodes 14 may subscribe to one or more of the subscription-based content, and in return, the subscribed to content is periodically sent to each of the respective subscribing client nodes 14 either from the server node 12 or from another nearby client node. Providers of the subscription-based content are then charged a fee for the serving of the content to the client nodes.

In a preferred embodiment, the subscription-based content may be made available for free or for a fee (e.g., pay-per-view files). If the content if fee-based, then a fee may be charged to the users of the subscribing client nodes for receiving or opening the fee-based content. The fee charged to the users may be in addition to, or in lieu of, the fee charged to the providers of the subscription-based content. The fee charged to the content providers may be based on quality of service or a priority level chosen for delivering the particular content, and the quantity of data delivered. A high priority means that the content will be allocated adequate bandwidth to deliver the file within a particular time frame and at the exclusion of other file deliveries if necessary.

In a preferred embodiment, all content 20 transferred across the network is secured by digitally signing each file using public/private key encryption, explained further below. As shown in FIG. 1B, in a preferred embodiment of the present invention, each server node 12 includes several databases for implementing the functions described above. The server node 12 includes a query database 24, a location database 26, a fingerprint database 28, a certificate database 30, and a user database 32. The query and a location databases 24 and 26 store the names and locations of the files shared on the network, respectively. The fingerprint database 28 stores fingerprint information that has been generated for each file for determining the authenticity of the files. The certificate database 30 contains certificate information to certify and verify the authenticity of all users of the file network 10. And the user database 32 includes account information for the users of the client nodes 14.

Although the network 10 effectively provides a mechanism for secure file sharing, the network experiences inefficient network bandwidth and traffic utilization when a file is transferred across nodes that are congested or have low bandwidth, while other nodes are idle or have excess bandwidth.

The present invention provides a method and system for more efficiently transferring files across the peer-to-peer network 10. According to the present invention, when a digital file is to be transferred over the network from a sending node to a receiving node, other nodes in the network are allowed to submit bids to transport the file over the network. Nodes submitting the bids are typically nodes with excess bandwidth. The node with the lowest submitted bid is then allowed to transport to file to the receiving node, thereby utilizing excess network bandwidth and optimizing network traffic based on economics.

Figure 2A:
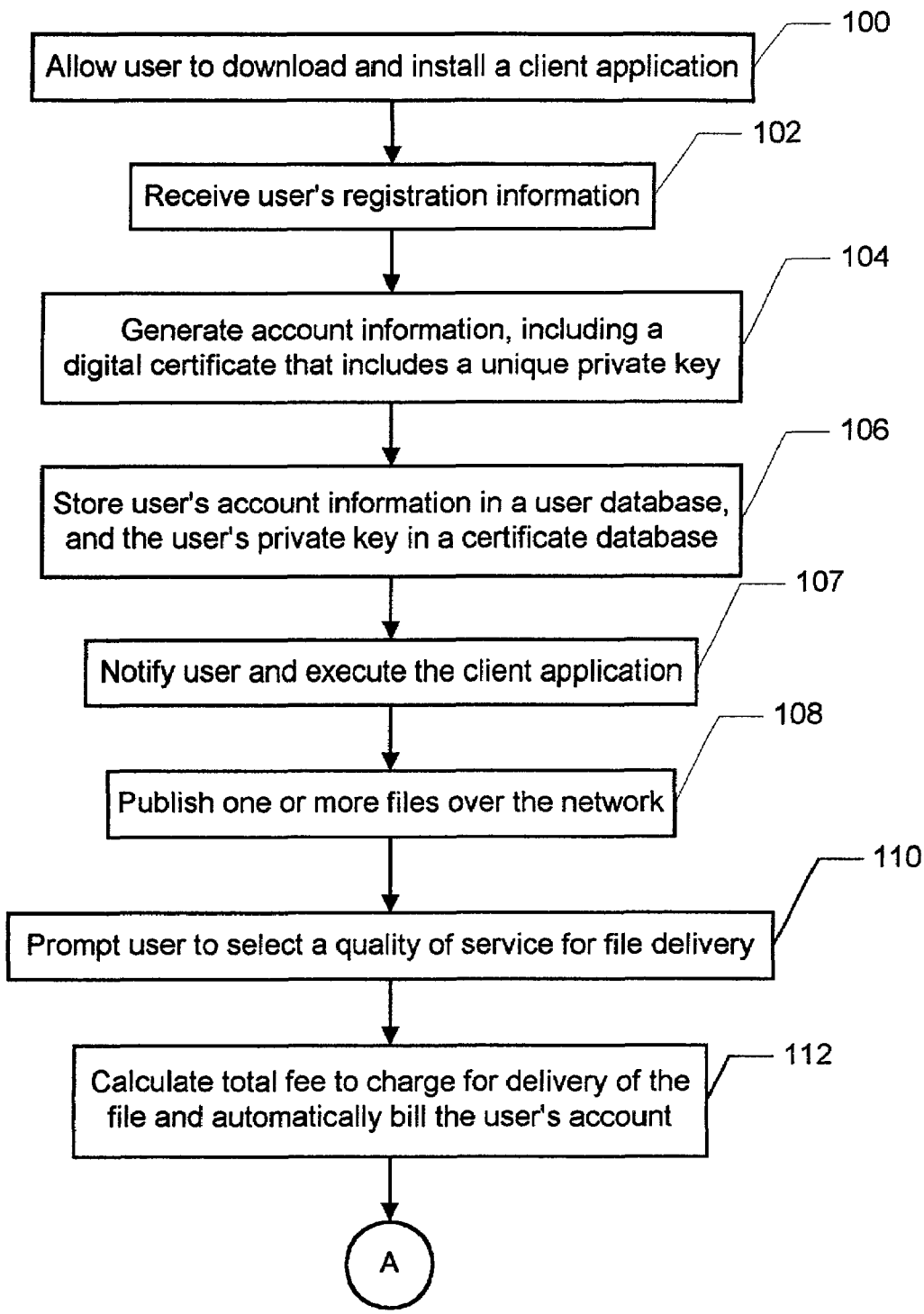
FIGS. 2A-2C are flow charts illustrating a process for efficiently transporting digital files over a peer-to-peer network in accordance with one preferred embodiment of the present invention.
Figure 2B:
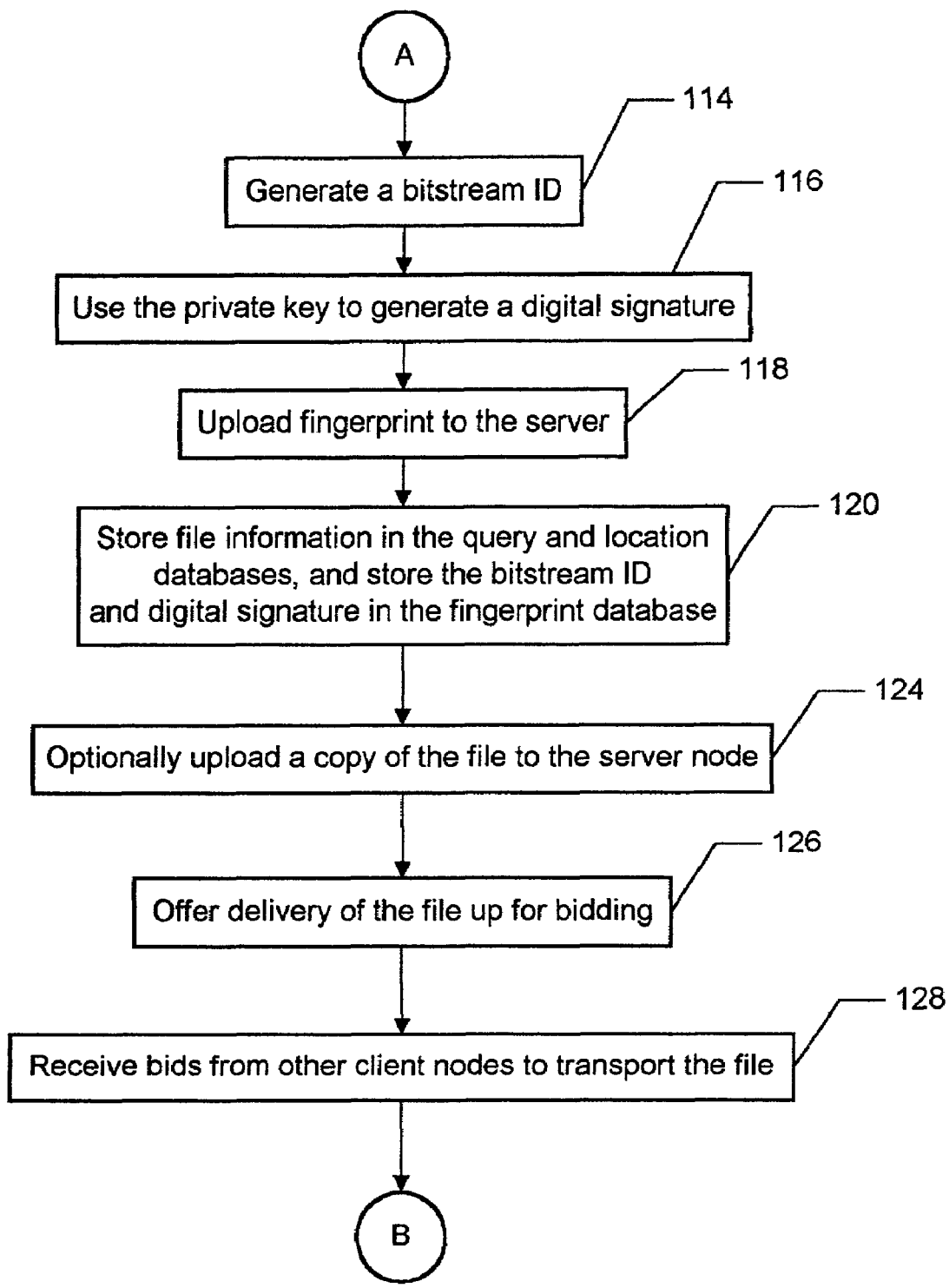
Figure 2C:
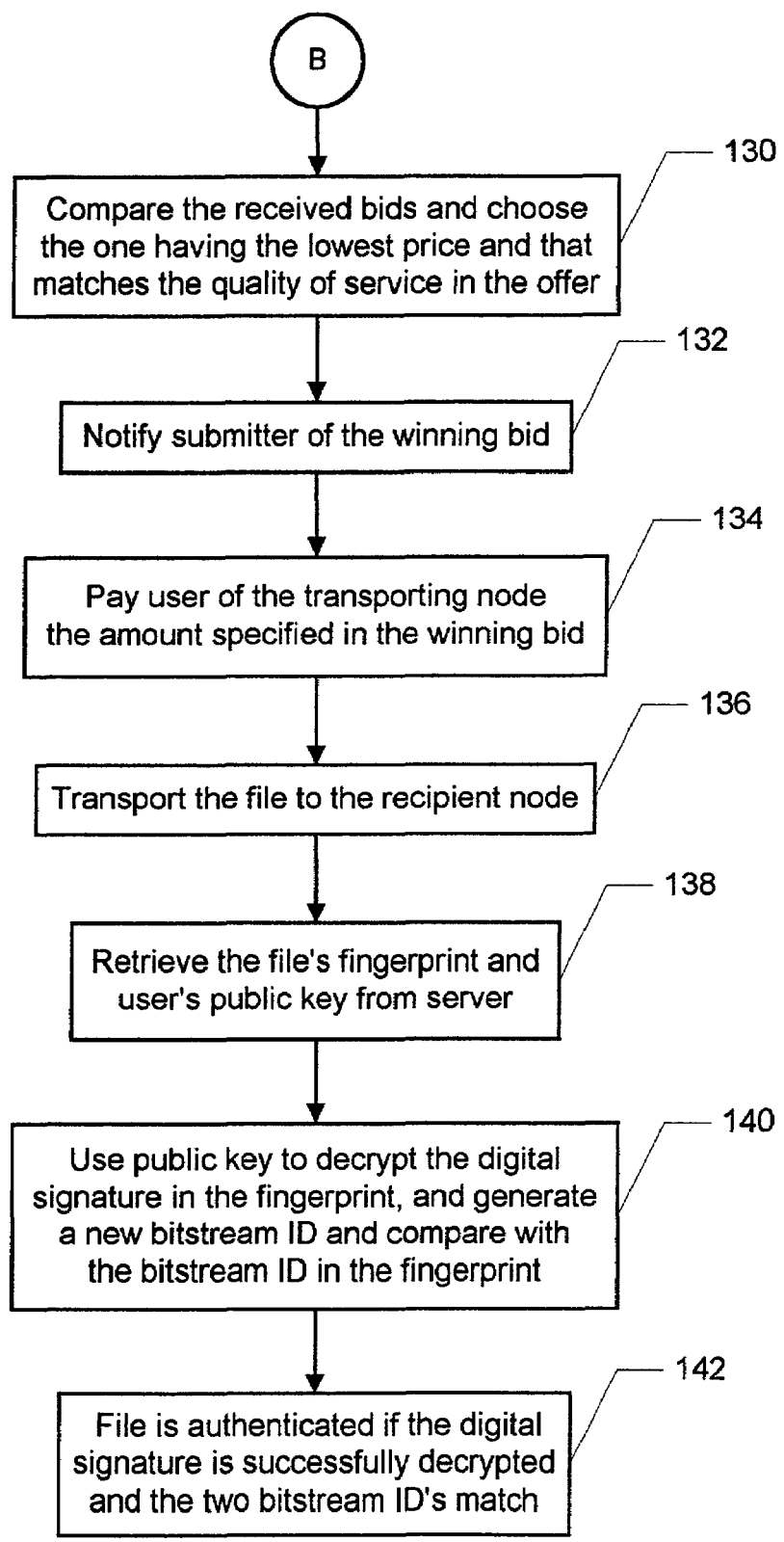

FIGS. 2A-2C are flow charts illustrating a process for efficiently transporting digital files over a peer-to-peer network in accordance with one preferred embodiment of the present invention. The process begins by allowing a user to become a member of the network 10 by downloading and installing a copy of the P2P client application 22 on the user's computer in step 100. In a preferred embodiment, the P2P client application 22 is downloaded from one of the server nodes 12, although the P2P client application 22 may be obtained from other sources.

Next, the server node 12 receives registration information entered by the user in step 102, which can include billing information, e-mail address, and demographic information for direct marketing purposes. In response, the server node 12 generates account information for the user, including a digital certificate that includes a public key 36 and a private key 38 in step 104. The user's account information, such as the user ID 39, is stored in the user database 32, and the user's public key 36 and private key 38 are stored in the certificate database 30 in step 106. When registration is complete, the user is notified and may then execute the P2P client application 22 in step 107. When the client node 12 invokes the client application 22, a client application desktop window is displayed on the computer 18.

Figure 3:
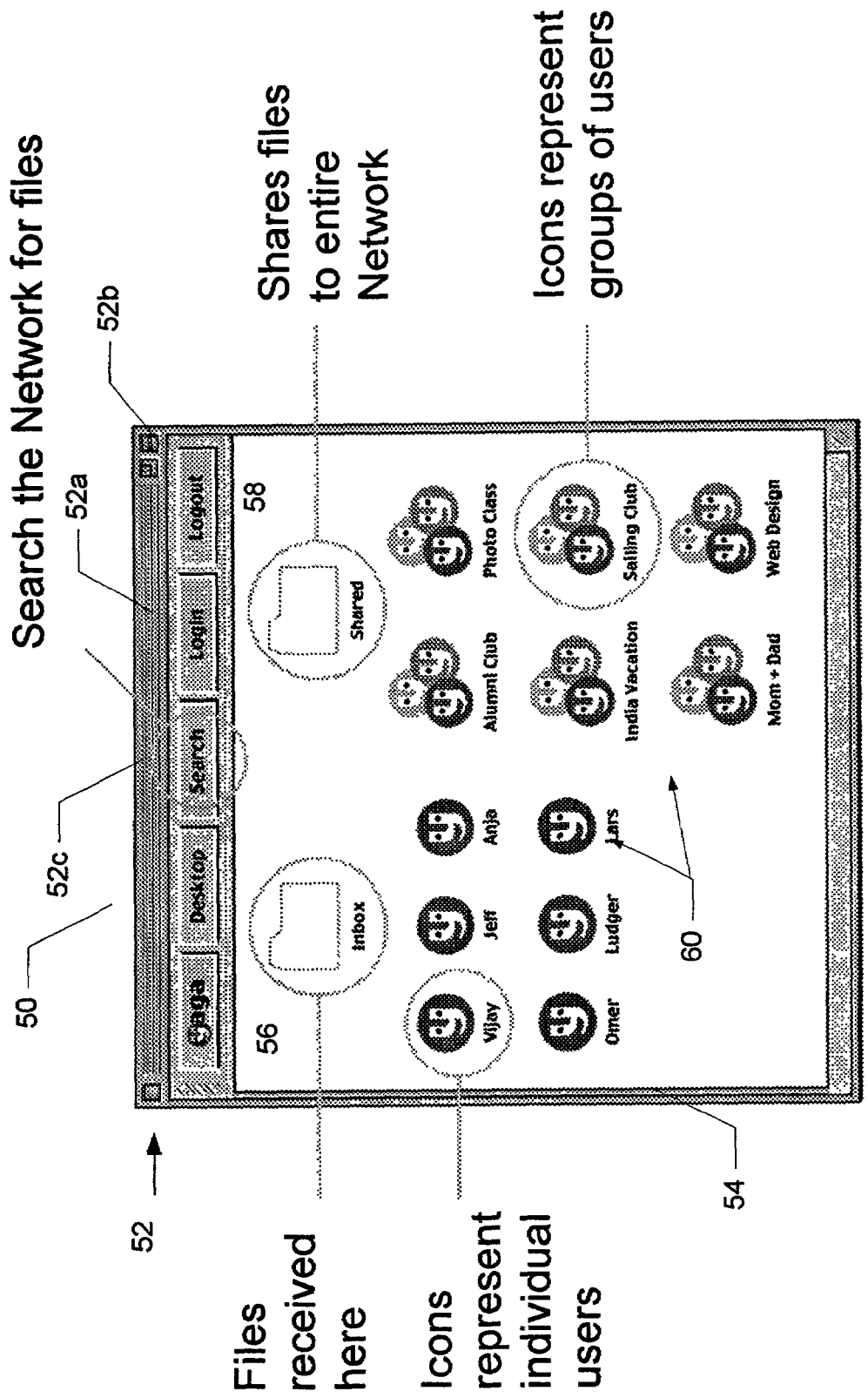
FIG. 3 is a block diagram illustrating a preferred embodiment of the client application desktop window.

Referring now to FIG. 3, a block diagram is shown illustrating a preferred embodiment of the client application desktop window. The client application desktop window 50 may include a row of command buttons 52, and an area 54 for displaying folders and icons. The user logs in and out of the network 10 via command buttons 52a and 52b, and may search for files on the network via the search button 52c. An inbox folder 56 contains files and notifications that are received from the network 10, and a shared folder 58 contains files that the user wishes to publish over the network 10 for access by other client nodes 14. User icons 60 represent individual users and groups of users to which the user wants to exchange files with on a peer-to-peer basis.

The P2P client application 22 allows the user to perform four primary functions: publish and share files over the network, receive files over the network, search for files to download, and subscribe to content over the network.

The user may publish one or more files over the network 10 using the desktop window 50 in step 108. If the user places the file into the shared folder 58, then the file will be made publicly available on the network for searching by other client nodes 14 by adding the file to a searchable index of shared files on the server node 14. If the user places the file onto one of the user icons 60, then the file will be sent to the recipient by direct file transfer.

After the file has been dropped over an icon or folder, the user is prompted to select a quality of service for file delivery in step 110. In a preferred embodiment, examples of quality of service include immediate delivery, scheduled delivery, express delivery, and bulk rate. The user may also be shown the fees the network provider charges for each quality of service, which may be set according to the level of the quality of service. Thus, the sender is given the ability to specify how much to pay for delivery of the file and the time frame for arrival.

When the user has finished publishing files and selecting quality of service options, the client application calculates the total fee the network provider will charge the user for delivery of the files and automatically bills the user's account in step 112.

Referring to both FIGS. 1B and 2B, secure file transfers are enabled by creating a fingerprint for each file when the file is published via steps 114-120. First, the P2P client application 22 generates a bitstream ID 34 for the file in step 114. In a preferred embodiment, the bitstream ID 34 is generated by calculating binary values in data blocks of the file itself. The P2P client application 22 then uses the private key 38 to generate a digital signature 40 for the file in step 116. In an alternative embodiment, the private key 38 may also be used to encrypt the bitstream ID. Together, the bitstream ID 34, the file information, and the digital signature 40 form the fingerprint for the file. The fingerprint ensures that the file is transmitted in its original state (data integrity) by the identified user/publisher.

After the fingerprint is generated, the fingerprint is uploaded to the server node 12 in step 118. The file information is stored in the query and location databases 24 and 26, and the bitstream ID 34 and digital signature 40 are stored in the fingerprint database 28 under an entry for the file in step 120. Preferably, the name of the file is stored in the query database 22, while attributes of the file, such as the identity of the user/publisher and the publishing node, the file size, the bit rate of the file, and so on, are stored in the location database 26.

After the file fingerprint has been uploaded, the file is ready for transmission over the network 10. In a preferred embodiment, the client application 22 optionally uploads a copy of the file to the server node 14 in step 124 so that when the recipient node is off-line at the time the file is to be delivered, the server node 14 can deliver the file when the recipient node comes back on-line.

According to the present invention, once the file fingerprint has been uploaded to the server node 14, the server 14 offers delivery of the file up for bidding from a central location in step 126. In a preferred embodiment, each offer is an entry on a web page that includes the name and size of the file, the chosen quality of service level, the location of recipient, and a bid submission time limit.

There are many nodes 12 in the network that have excess bandwidth at any given point in time and who would be willing to submit bids to transport the file. Examples of bidders include Internet Service Providers (ISP's) and web hosting services, for instance, which upon detecting excess capacity place bids.

Upon detecting excess network capacity, other nodes 12 and 14 may respond to one or more offers by placing a bid to transport the file in step 128, which are then received by the server node 14. The bid identifies the bidding node and includes a predetermined price and a quality of service for delivery. In a preferred embodiment, bidders can offer ratcheted down bids where a bid begins with a preset price and is automatically lowered in increments until the bid is accepted.

Depending on the cost of the service and the usage patterns of the bidder's computers, bidders may typically place bids only during certain times of the day, usually during off-peak times (e.g., 5 pm to 7 am). Because the cost of servers and bandwidth is fixed, the present invention provides nodes on the network a method for selling excess off-peak capacity, and recouping some of their fixed cost.

In an alternative embodiment, bidders may also place bids using criteria other than money. For example, the sender and/or receiver's group affiliation may be ascertained by the bidder, and based on the group affiliation, the bidder may decide to transport the file for free and submit a $0 bid. An example is a peer-based fan/game club, where members of the club submit bids to transport files for the other members at no cost.

Referring to FIG. 2C, after the bid submission time limit has expired for a particular offer, the server 14 compares the received bids and chooses the one having the lowest price and that matches the quality of service in the offer in step 130. The submitter of the winning bid is notified and provided with the information necessary to transport (or to schedule transport) the file across the network 10 in step 132. For example, if the quality of service is immediate delivery, then the bidder may transport the file peer-to-peer. However, if the delivery time of the file is 2 AM, but it is only 3 PM in the afternoon, then the file is queued, but not transmitted.

In the embodiment, where the receiving node is off-line at the appointed time of delivery, the server node 14 may deliver the file when the receiving node comes back online.

In an alternative embodiment, if the file has been copied to the server node 14, the server node 14 may deliver the file when the receiving node comes on-line.

After the node submitting the winning bid has been notified, the network provider pays the user of the node the amount specified in the winning bid in step 134. Before or after payment, the file is transported by the bidding node and received by the recipient node in step 136. In a preferred embodiment, the file is placed in the user's inbox 56 of the client application 22 upon receipt. When the file is received, the client application 22 begins the authentication process by retrieving the fingerprint associated with the file and the user's public key from the server node 12 in step 138. Alternatively, the public key may be retrieved from the sender.

The public key is used to decrypt the digital signature 40 in the fingerprint, and a new bitstream ID is generated and compared with the bitstream ID 34 in the fingerprint in step 140. If the digital signature is successfully decrypted and the two bitstream ID's match, then the file is authenticated in step 142. In the embodiment where the bitstream ID is encrypted, the encrypted bitstream ID in the fingerprint must be decrypted with the public key before the comparison. Fingerprinting files as described herein allows the receiving node to determine the authenticity of both the file and the publisher. In an alternative embodiment, another level of security may be added to the fingerprint authentication by encrypting the file with the user's private key upon publication. When the file is received and authenticated, the user's public key may be used to decrypt the file.

A method and system for efficiently transporting digital files in a peer-to-peer file delivery network has been disclosed. For a worldwide network, at some point during the day there is always idle network bandwidth available for delivering files. Consequently, the bidding system of the present invention for file delivery takes advantage of idle bandwidth of the network nodes and allows user's of the nodes to use down time to generate additional revenue. The result is that network traffic and routing is optimized base on economics.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for efficiently transporting digital files over a peer-to-peer network comprising at least one server node and multiple client nodes, the method comprising the steps of:
   a. when a digital file is to be transferred over the peer-to-peer network from a sending node to a receiving node, allowing other nodes to submit bids to transport the digital file over the peer-to-peer network for a particular price;
   b. allowing a sender to specify a particular quality of service for delivery of the digital file, the quality of service including immediate delivery and scheduled delivery;
   c. allowing the node with a lowest bid to transport the digital file to the receiving node, thereby optimizing network traffic based on economics; and
   d. uploading the digital file from the sending node to the at least one server node; and
   e. delivering the digital file from the at least one server node when the receiving node comes online when the specified quality of service is immediate delivery and the receiving node is off-line.

2. The method of claim 1 further including the step of paying a user of the transporting node the particular price.

3. The method of claim 2 further including the step of billing the user of the sending node.

4. The method of claim 1 further including the step of setting the price to transport the digital file based on the specified quality of service.

5. The method of claim 4 further including the step of if the specified quality of service is immediate delivery, then sending the digital file peer-to-peer.

6. The method of claim 5 further including the step of queuing file transmission until a scheduled time when the specified quality of service is scheduled delivery.

7. The method of claim 1 further including the step of requiring the submitted bids to include price and the quality of service.

8. A peer-to-peer network for efficiently transporting digital files, the peer-to-peer network comprising:
   multiple client nodes coupled with the peer-to-peer network; and
   a server node coupled with the peer-to-peer network, wherein the server node is adapted to:
      allow other nodes to submit bids to transport a digital file over the peer-to-peer network for a particular price when the digital file is to be transferred from a sending node to a receiving node;
      allow a quality of service for delivery of the digital file to be specified, the quality of service including immediate delivery and scheduled delivery;
      allow the node with a lowest bid to transport the digital file to the receiving node, thereby optimizing network traffic based on economics;
      upload the digital file from the sending node; and
      deliver the digital file when the receiving node comes online when the specified quality of service is immediate delivery and the receiving node is off-line.

9. The peer-to-peer network of claim 8 wherein a user of the transporting node is paid the particular price.

10. The peer-to-peer network of claim 9 wherein the user of the sending node is billed.

11. The peer-to-peer network of claim 8 wherein the price to transport the digital file is determined based on the specified quality of service.

12. The peer-to-peer network of claim 11 wherein the digital file is sent to the peer-to-peer network if the specified quality of service is immediate delivery.

13. The peer-to-peer network of claim 12 wherein if the specified quality of service is scheduled delivery, then the digital file is queued for transmission until a scheduled time.

14. The peer-to-peer network of claim 8 wherein the submitted bids include price and the quality of service.

15. A method for efficiently transporting digital files comprising,
   a. providing a peer-to-peer network that includes at least one server node and multiple client nodes;
   b. when a digital file is to be transferred over the peer-to-peer network from a sending node to a receiving node, allowing other nodes to submit bids to transport the digital file over the peer-to-peer network for a particular price;
   c. allowing a quality of service for delivery of the digital file to be specified, the quality of service including immediate delivery and scheduled delivery;

d. allowing the node with a lowest bid to transport the digital file to the receiving node;
e. uploading the digital file from the sending node to the at least one server node;
f. delivering the digital file from the at least one server node when the receiving node comes online when the specified quality of service is immediate delivery and the receiving node is off-line; and
g. billing a user account of the sending node, and paying a user of the transporting node the particular price, thereby optimizing network traffic based on economics.

16. The method of claim 15 further including the step of setting the price to transport the digital file based on the specified quality of service.

17. The method of claim 16 further including the step of if the specified quality of service is immediate delivery, then sending the digital file peer-to-peer.

18. The method of claim 17 further including the step of if the specified quality of service is scheduled delivery, then queuing file transmission until a scheduled time.

19. The method of claim 18 further including the step of requiring the submitted bids to include price and the quality of service.

20. A peer-to-peer network for efficiently transporting digital files, the peer-to-peer network comprising:
    multiple client nodes coupled with the peer-to-peer network; and
    a server node coupled with the peer-to-peer network, wherein the server node is adapted to:
        allow other nodes to submit bids to transport the digital file over the peer-to-peer network for a particular price when the digital file is to be transferred over the peer-to-peer network from a sending node to a receiving node;
        allow a quality of service for delivery of the digital file to be specified, the quality of service including immediate delivery and scheduled delivery;
        allow the node with a lowest bid to transport the digital file to the receiving node;
        upload the digital file from the sending node;
        deliver the digital file when the receiving node comes online when the specified quality of service is immediate delivery and the receiving node is off-line; and
        bill a user account of the sending node, and paying a user of the transporting node the particular price, thereby optimizing network traffic based on economics.

21. The peer-to-peer network of claim 20 wherein the price to transport the digital file is determined based on the specified quality of service.

22. The peer-to-peer network of claim 21 wherein the digital file is sent peer-to-peer if the specified quality of service is immediate delivery.

23. The peer-to-peer network of claim 22 wherein if the specified quality of service is scheduled delivery, then the digital file is queued for transmission until a scheduled time.

24. The peer-to-peer network of claim 23 wherein the submitted bids include price and the quality of service.

25. A peer-to-peer network for efficiently transporting digital files, the peer-to-peer network including at least one server node and multiple client nodes coupled to the peer-to-peer network, the peer-to-peer network further comprising:
    other nodes adapted to submit bids to transport a digital file over the peer-to-peer network for a particular price when the digital file is to be transferred from a sending node to a receiving node, wherein a quality of service for delivery is specified where the quality of service includes immediate delivery and scheduled delivery; and
    wherein one node of the other nodes with a lowest bid to transport the digital file to the receiving node is selected to transport the digital file, thereby optimizing network traffic based on economics where the digital file is uploaded from the sending node to the at least one server node and the digital file is delivered from the at least one server node when the receiving node comes online when the specified quality of service is immediate delivery and the receiving node is off-line.

26. A peer-to-peer network for efficiently transporting digital files, the peer-to-peer network including at least one server node and multiple client nodes coupled to the peer-to-peer network, the peer-to-peer network further comprising:
    other nodes adapted to submit bids to transport a digital file over the peer-to-peer network for a particular price when the digital file is to be transferred over the peer-to-peer network from a sending node to a receiving node, wherein a quality of service for delivery is specified where the quality of service includes immediate delivery and scheduled delivery;
    one of the other nodes being selected based on the one of the other nodes having a lowest bid to transport the digital file to the receiving node, where the digital file is uploaded from the sending node to the at least one server node and the digital file is delivered from the at least one server node when the receiving node comes online when the specified quality of service is immediate delivery and the receiving node is off-line; and
    the one of the other nodes selected to transport the digital file is further adapted to bill a user account of the sending node, such that a user of the transporting node is paid the particular price, thereby optimizing network traffic based on economics.

* * * * *